United States Patent
Yamamoto (10) Patent No.: US 12,403,555 B2
(45) Date of Patent: Sep. 2, 2025

(54) MACHINE TOOL CONTROL DEVICE

(71) Applicant: FANUC CORPORATION, Yamanashi (JP)

(72) Inventor: Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 310 days.

(21) Appl. No.: 18/006,855

(22) PCT Filed: Jul. 27, 2021

(86) PCT No.: PCT/JP2021/027740
§ 371 (c)(1),
(2) Date: Jan. 25, 2023

(87) PCT Pub. No.: WO2022/025056
PCT Pub. Date: Feb. 3, 2022

(65) Prior Publication Data
US 2023/0271291 A1     Aug. 31, 2023

(30) Foreign Application Priority Data
Jul. 29, 2020    (JP) ................ 2020-128129

(51) Int. Cl.
*B23Q 15/013*     (2006.01)
*B23Q 15/12*      (2006.01)
*B23Q 15/16*      (2006.01)

(52) U.S. Cl.
CPC ........... *B23Q 15/013* (2013.01); *B23Q 15/12* (2013.01); *B23Q 15/16* (2013.01)

(58) Field of Classification Search
CPC ....... B23Q 15/013; B23Q 15/12; B23Q 15/16
See application file for complete search history.

(56) References Cited

U.S. PATENT DOCUMENTS

2001/0013267 A1    8/2001  Endo et al.
2018/0281139 A1*  10/2018  Yamamoto ............. B23B 13/08
(Continued)

FOREIGN PATENT DOCUMENTS

CN     116157219 A    5/2023
JP     2003-059056 A  2/2003
(Continued)

OTHER PUBLICATIONS

International Search Report issued in PCT/JP2021/027740; mailed Oct. 26, 2021.

*Primary Examiner* — Omar Flores Sanchez
(74) *Attorney, Agent, or Firm* — Studebaker Brackett PLLC (57) ABSTRACT

The purpose of the present invention is to provide a device for controlling a machine tool with which it is possible to smoothly stop oscillation at an arbitrary timing without loss of cutting-chip-shredding performance, and to minimize shock produced in the machine tool. The present invention provides a device 1 for controlling a machine tool for performing machining while causing a tool and a workpiece to oscillate relative to each other, the device 1 for controlling a machine tool comprising: an oscillation command generation unit 12 for generating an oscillation command on the basis of a machining condition and an oscillation condition; an oscillation stoppage assessment unit 13 for assessing the timing of oscillation stoppage; and a position speed control unit 17 for causing, on the basis of a superimposition command generated by superimposing the oscillation command onto a position command or a position deviation, the tool and the workpiece to oscillate relative to each other. The oscillation command generation unit 12 causes the oscillation amplitude to gradually attenuate from the timing at
(Continued)

which oscillation stoppage is communicated from the oscillation stoppage assessment unit 13.

20 Claims, 4 Drawing Sheets

(56) References Cited

U.S. PATENT DOCUMENTS

| | | | |
|---|---|---|---|
| 2018/0299857 A1 | 10/2018 | Oho et al. | |
| 2018/0307196 A1* | 10/2018 | Oho | B23Q 15/12 |
| 2023/0271291 A1* | 8/2023 | Yamamoto | B23B 25/02 |
| | | | 83/13 |
| 2024/0152116 A1* | 5/2024 | Oikawa | G05B 19/404 |
| 2024/0316713 A1* | 9/2024 | Yasuda | G05B 19/4093 |

FOREIGN PATENT DOCUMENTS

| | | |
|---|---|---|
| JP | 2017-107398 A | 6/2017 |
| JP | 2018-005423 A | 1/2018 |
| JP | 2019-028597 A | 2/2019 |
| WO | 2015/140906 A1 | 9/2015 |
| WO | 2016/047485 A1 | 3/2016 |

\* cited by examiner

OSCILLATION STOP NOTIFICATION

FIG. 3

OSCILLATION STOP NOTIFICATION

MACHINE TOOL CONTROL DEVICE

TECHNICAL FIELD

The present invention relates to a machine tool control device.

BACKGROUND ART

Typically, oscillation cutting has been employed in some cases as measures taken against chips caused in, e.g., cutting in a drilling or turning process. In a case where oscillation is stopped in machining to which oscillation cutting is applied, if a movement command rapidly changes, shock is caused on a machine tool. The shock on the machine influences, e.g., the life of a machining tool and the accuracy of a machined workpiece.

As a technique for oscillation stop, a technique of decreasing an oscillation amplitude in accordance with feeding movement when reaching a machining stop position in order to prevent cutting beyond the machining stop position has been proposed (see, e.g., Patent Document 1), for example.

Patent Document 1: PCT International Publication No. WO2016/047485

DISCLOSURE OF THE INVENTION

Problems to be Solved by the Invention

However, the technique of Patent Document 1 is not intended to reduce shock caused on a machine tool. Moreover, the technique of Patent Document 1 is intended to decrease the oscillation amplitude according to, e.g., a remaining movement distance until reaching the predetermined machining stop position, and is not intended to smoothly stop oscillation at an arbitrary timing.

Thus, there has been a technique capable of smoothly stopping oscillation at an arbitrary timing without degradation of chip shredding properties and reducing shock caused on a machine tool.

Means for Solving the Problems

The present disclosure relates to a control device for a machine tool that performs machining while causing a tool and a workpiece to oscillate relative to each other. The control device includes an oscillation command generator that generates an oscillation command based on an oscillation condition, an oscillation stop determinator that determines an oscillation stop timing, and a controller that causes the tool and the workpiece to oscillate relative to each other based on a superimposition command generated by superimposition of the oscillation command on a movement command. The oscillation command generator gradually attenuates an oscillation amplitude from a timing of notifying oscillation stop from the oscillation stop determinator.

Effects of the Invention

According to one aspect of the present disclosure, the machine tool control device can be provided, which can smoothly stop oscillation at an arbitrary timing without degradation of chip shredding properties and can reduce shock caused on the machine tool.

PREFERRED MODE FOR CARRYING OUT THE INVENTION

Hereinafter, one embodiment of the present disclosure will be described in detail with reference to the drawings.

Figure 1:
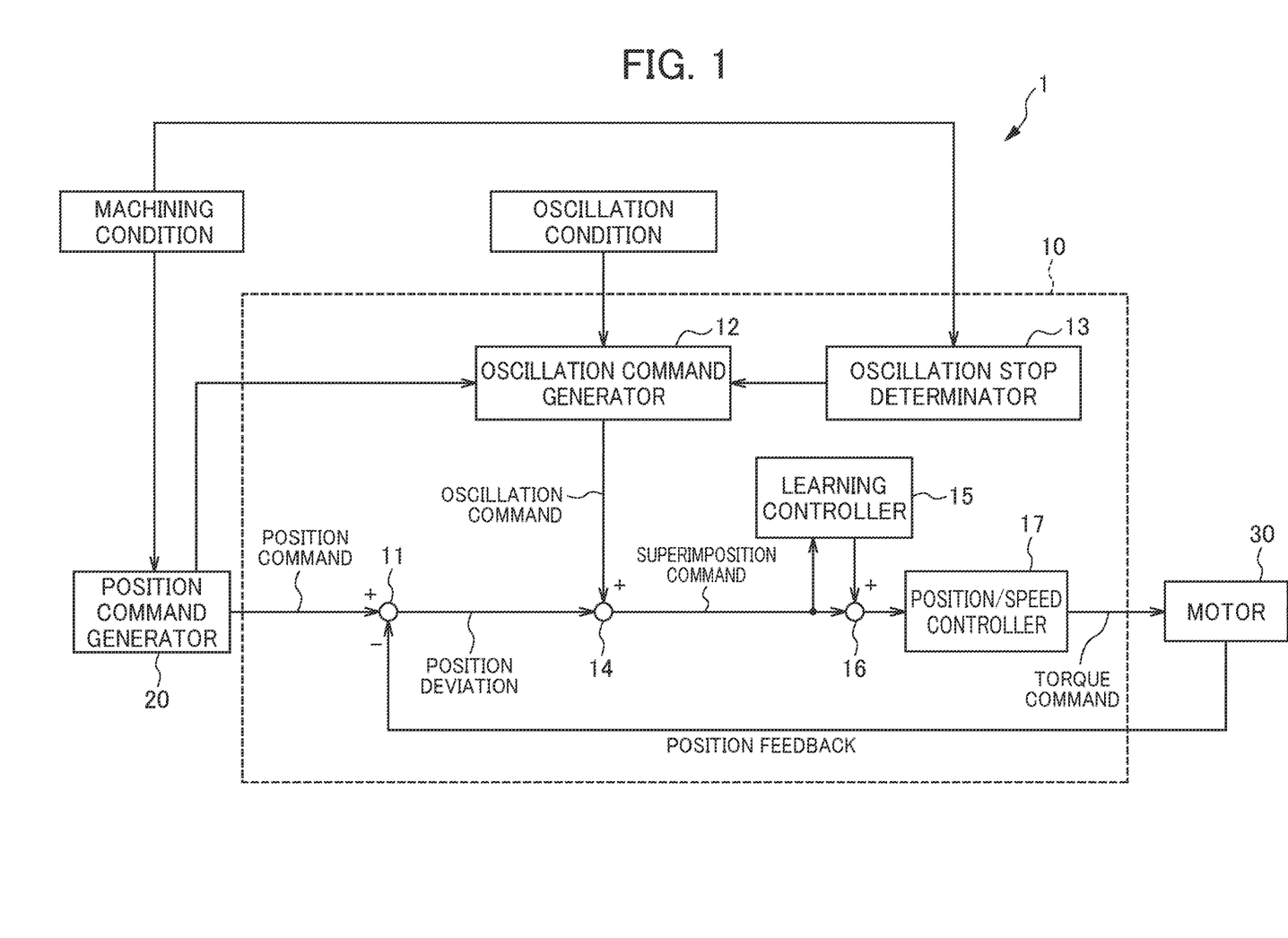
FIG. 1 is a diagram showing the configuration of a machine tool control device according to one embodiment of the present disclosure.

FIG. 1 is a diagram showing the configuration of a machine tool control device 1 according to one embodiment of the present disclosure. As shown in FIG. 1, the machine tool control device 1 according to the present embodiment includes a servo control device 10, and controls driving of a motor 30 that drives a feed axis.

As shown in FIG. 1, the machine tool control device 1 according to the present embodiment includes a first adder 11, an oscillation command generator 12, an oscillation stop determinator 13, a second adder 14, a learning controller 15, a third adder 16, and a position/speed controller 17.

The machine tool control device 1 according to the present embodiment generates a position command which is a movement command for the motor 30 based on a machining condition by a position command generator 20. As shown in FIG. 1, the generated position command is input to the first adder 11 of the servo control device 10 as described later.

The first adder 11 calculates a position deviation. Specifically, the first adder 11 calculates a position deviation which is a difference between the position command and a position feedback based on position detection on the feed axis by an encoder of the motor 30.

The oscillation command generator 12 generates an oscillation command based at least on an oscillation condition. The oscillation command generator 12 may obtain the oscillation command from the machining condition and the oscillation condition including an oscillation amplitude multiplying factor and an oscillation frequency multiplying factor, or may obtain the oscillation command from the oscillation condition including an oscillation amplitude and an oscillation frequency. For example, in the present embodiment, the oscillation amplitude multiplying factor and the oscillation frequency multiplying factor are used as the oscillation condition upon calculation of the oscillation command. In a case of application to, e.g., a case where an oscillation axis is stopped, even the stopped axis can be oscillated as long as the oscillation amplitude and the oscillation frequency are directly used as the oscillation condition. The condition including the multiplying factors and the condition including the non-multiplying factors may be combined as necessary.

Moreover, the oscillation command generator 12 gradually attenuates the oscillation amplitude from a timing of notifying oscillation stop from the later-described oscillation stop determinator 13. Attenuation of the oscillation amplitude upon oscillation stop notification will be described later in detail.

The oscillation stop determinator 13 determines an oscillation stop timing. Specifically, the oscillation stop determinator 13 may determine the oscillation stop timing based on the machining condition, or may determine the oscillation stop timing according to an external notification. More specifically, the oscillation stop determinator 13 determines, according to, e.g., a machining program or parameter setting or external signal input, the oscillation stop at an arbitrary timing during machining and notifies the oscillation stop timing to the oscillation command generator 12. The oscillation stop determinator 13 may notify the oscillation stop to the oscillation command generator 12 in advance so that oscillation can be stopped at an arbitrary timing.

The second adder 14 generates a superimposition command. Specifically, the second adder 14 generates a superimposition command by superimposition of the oscillation command generated by the oscillation command generator 12 on the position deviation calculated by the first adder 11. Note that the second adder 14 may be configured to add the oscillation command generated by the oscillation command generator 12 to the position command. Alternatively, the oscillation command generator 12 may be configured to generate the oscillation command (a speed command), and the second adder 14 may be configured to add the oscillation command to the movement command (a speed command).

The learning controller 15 calculates a superimposition command compensation amount based on the superimposition command, and compensates the superimposition command in such a manner that the calculated compensation amount is added to the superimposition command by the third adder 16. The learning controller 15 has a memory, stores, in the memory, the oscillation phase and the compensation amount in association with each other in one or more cycles of oscillation, reads the superimposition command stored in the memory at a timing of being able to compensate a phase lag in oscillation according to responsiveness of the motor 30, and outputs the compensation amount to the third adder 16. In a case where the oscillation phase associated with the compensation amount to be output is not stored in the memory, the compensation amount to be output may be calculated from a compensation amount associated with an oscillation phase close to the above-described oscillation phase. Generally, the position deviation for the oscillation command increases as the oscillation frequency increases. Thus, the learning controller 15 performs compensation so that followability to the cyclical oscillation command can be improved.

The position/speed controller 17 generates, based on the superimposition command after addition of the compensation amount, a torque command for the motor 30 that drives the feed axis, thereby controlling the motor 30 according to the generated torque command. Accordingly, machining is performed while a tool and a workpiece are oscillating relative to each other.

Figure 2:
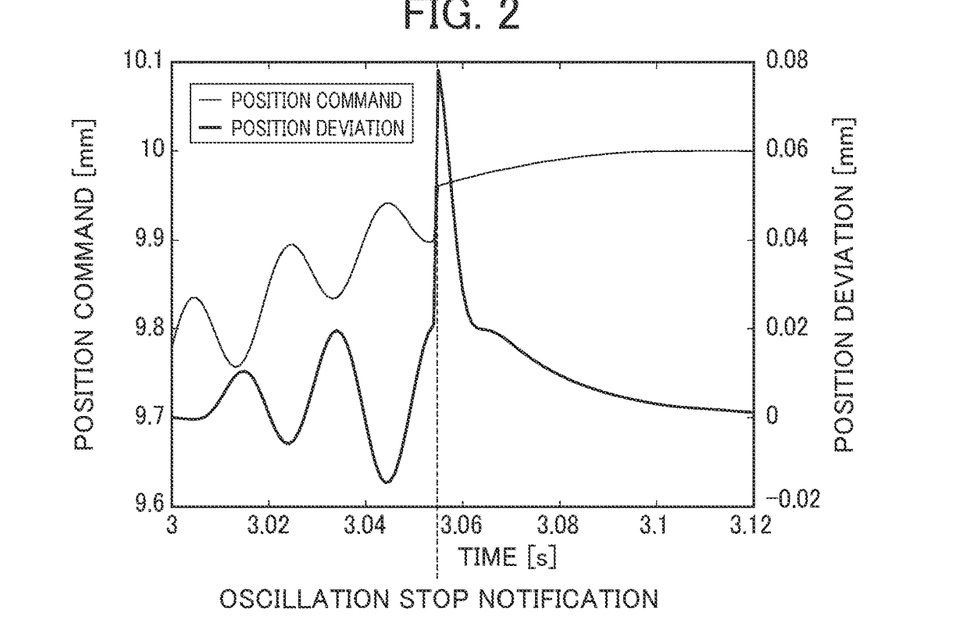
FIG. 2 is a graph showing a position command and a position deviation in conventional oscillation cutting.
Figure 3:
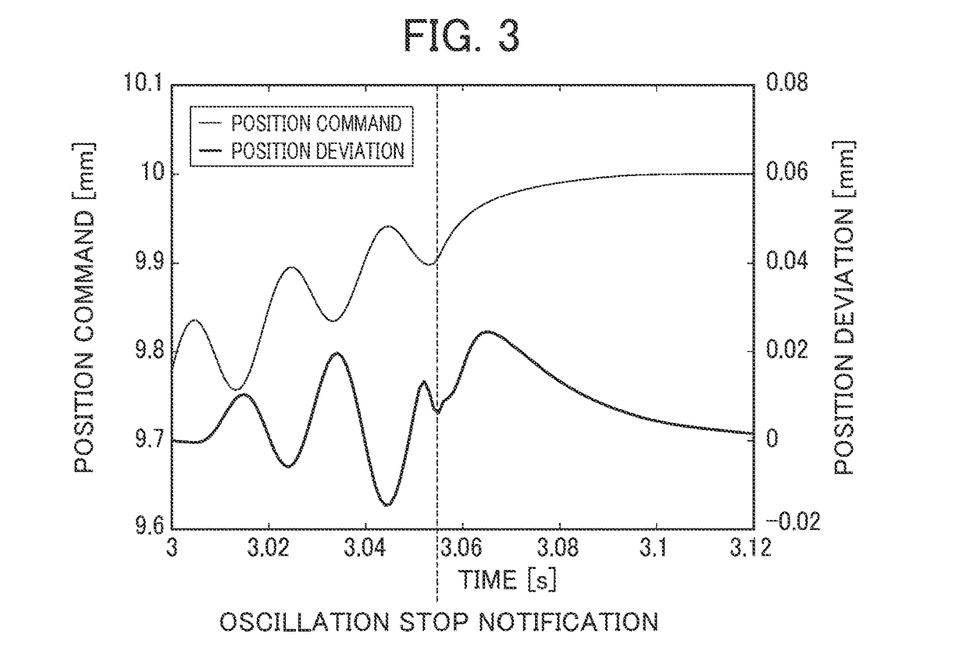
FIG. 3 is a graph showing a position command and a position deviation in oscillation cutting in one embodiment of the present disclosure.

Next, attenuation of the oscillation amplitude upon oscillation stop notification will be described in detail. FIG. 2 is a graph showing a position command and a position deviation in conventional oscillation cutting. FIG. 3 is a graph showing the position command and the position deviation in oscillation cutting in the first embodiment. The position command in this description means a superimposition command in the claims. In FIGS. 2 and 3, the horizontal axis represents a time (seconds), a first axis (left) as the vertical axis represents the position command (the superimposition command) (mm), and a second axis (right) as the vertical axis represents the position deviation (mm).

As shown in FIG. 2, in conventional oscillation cutting, an oscillation amplitude is not attenuated at a timing of notifying oscillation stop. Thus, the oscillation command suddenly reaches zero immediately after the oscillation stop, and accordingly, the position command rapidly changes and the position deviation rapidly increases. For this reason, great shock is caused on a machine tool, leading to, e.g., shortening of the life of a machining tool or degradation of the accuracy of a machined workpiece.

On the other hand, in the present embodiment, the oscillation command generator 12 is configured to gradually attenuate the oscillation amplitude from a timing of notifying the oscillation stop from the oscillation stop determinator 13. Thus, as shown in FIG. 3, in oscillation cutting in the present embodiment, the oscillation amplitude is gradually attenuated until the oscillation stop after a timing of notifying the oscillation stop. Thus, the position deviation smoothly changes without a rapid change in the position command. With this configuration, the shock caused on the machine tool can be reduced, and therefore, e.g., shortening of the life of a machining tool or degradation of the accuracy of a machined workpiece can be reduced.

A method for attenuating the oscillation amplitude by the oscillation command generator 12 upon oscillation stop notification is not particularly limited. For example, the oscillation command generator 12 may apply a filter to the oscillation amplitude immediately before the oscillation stop, thereby gradually attenuating the oscillation amplitude. Alternatively, the oscillation command generator 12 may decrement the oscillation amplitude immediately before the oscillation stop by a specified value, thereby gradually attenuating the oscillation amplitude.

The method for attenuating the oscillation amplitude by the oscillation command generator 12 upon oscillation stop notification will be described in mode detail with reference to a specific example. For example, in a case where the control cycle of the machine tool control device 1 according to the present embodiment is 1 ms, the oscillation command generator 12 may set oscillation amplitude attenuation such that the oscillation amplitude is attenuated within a period corresponding to the number of control cycles. For example, in a case of attenuation in four control cycles (4 ms), a primary low-pass filter with a time constant of $4/3$ ms may be applied, or the specified value for attenuation may be set to $1/4$ of the (current) oscillation amplitude.

An attenuation time may be determined from the oscillation frequency. For example, in a case of an oscillation frequency of 20 Hz, the oscillation cycle is 1/20=50 ms. In a case of attenuation within a $1/4$ cycle, it may be set such that the oscillation amplitude is attenuated in 50/4=12.5 ms. It may be configured such that in a case where the oscillation frequency changes, the time changes according to such a change.

Note that the above-described filter time constant and the above-described specified value may be set according to input from the program or a parameter, for example. The above-described filter time constant and the above-described specified value can be set to arbitrary values, and therefore, the oscillation amplitude can be reliably attenuated.

The oscillation command generator 12 may correct the oscillation amplitude and the oscillation phase so that oscillation can be stopped at an arbitrary timing notified by the external notification. That is, the oscillation command generator 12 may correct the oscillation amplitude and the oscillation phase according to not only a timing of notifying the oscillation stop from the oscillation stop determinator 13 but also an arbitrary timing of notifying the oscillation stop by the external notification in advance, thereby gradually attenuating the oscillation amplitude. With this configuration, the oscillation amplitude is attenuated at an arbitrary timing notified by the external notification so that oscillation can be stopped. Accordingly, the shock caused on the machine tool can be reduced, and degradation of a machining accuracy can be reduced.

The oscillation command generator 12 may stop update of the oscillation phase at a timing of notifying the oscillation stop from the oscillation stop determinator 13. Alternatively, the oscillation command generator 12 may advance the phase to a particular oscillation phase after notification of the oscillation stop from the oscillation stop determinator 13. Hereinafter, the way to update and advance the oscillation phase will be described in detail with reference to FIG. 4.

Figure 4:
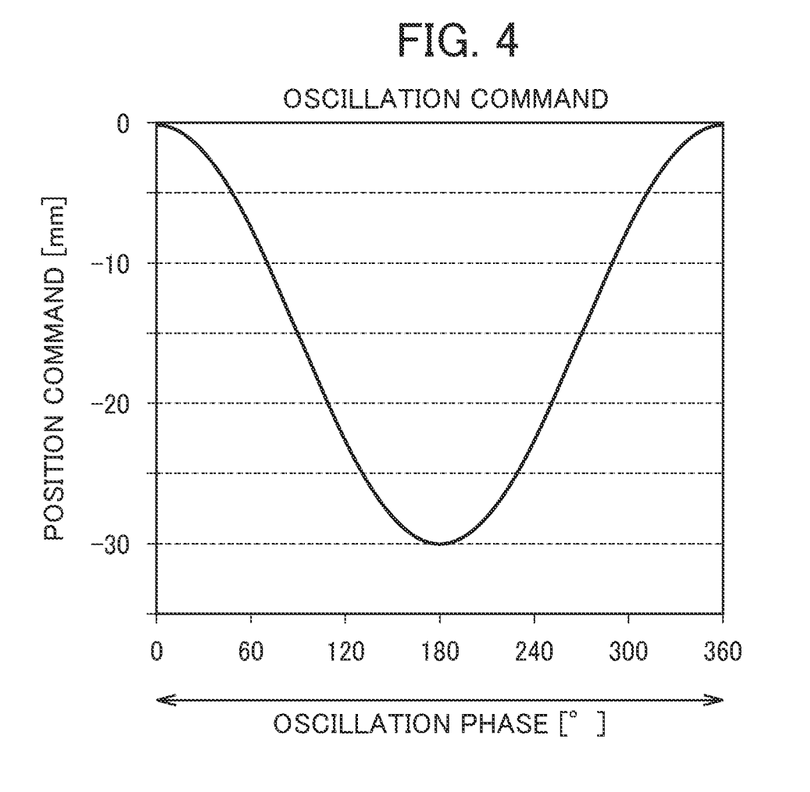
FIG. 4 is a graph for describing the way to update and advance an oscillation phase in oscillation cutting in one embodiment of the present disclosure.

Here, FIG. 4 is a graph for describing the way to update and advance the oscillation phase in oscillation cutting in one embodiment of the present disclosure. FIG. 4 specifically shows an oscillation command in the form of a sine wave. In FIG. 4, the horizontal axis represents the oscillation phase (°), and the vertical axis represents the position (mm).

In a case of generating the sine wave-shaped oscillation command as shown in FIG. 4, the level of the oscillation command at each oscillation phase changes. Since the oscillation command changes according to the oscillation phase, the speed of convergence of the oscillation command depends on the oscillation phase upon oscillation stop notification if the oscillation phase is continuously updated after oscillation stop notification. Thus, although the speed of convergence of the oscillation command cannot be increased to the speed of attenuation of the oscillation amplitude or more, an increase in the oscillation command beyond that upon oscillation stop notification can be avoided if update of the oscillation phase is stopped upon oscillation stop notification. Particularly, in the case of the oscillation command shown in FIG. 4, if the oscillation stop is notified at an oscillation phase of 0° to 180°, i.e., when the oscillation command (an absolute value of the oscillation command) increases, update of the oscillation phase is stopped so that an increase in the oscillation command beyond that upon oscillation stop notification can be avoided and convergence of the oscillation command can be speeded up.

In the case of the oscillation command shown in FIG. 4, the oscillation command is the smallest at an oscillation phase of 0° (360°). Thus, upon oscillation stop notification, the oscillation phase is advanced to 0° (360°), and then, update of the oscillation phase is stopped. In this manner, the speed of convergence of the oscillation command can be maximized.

Figure 5:
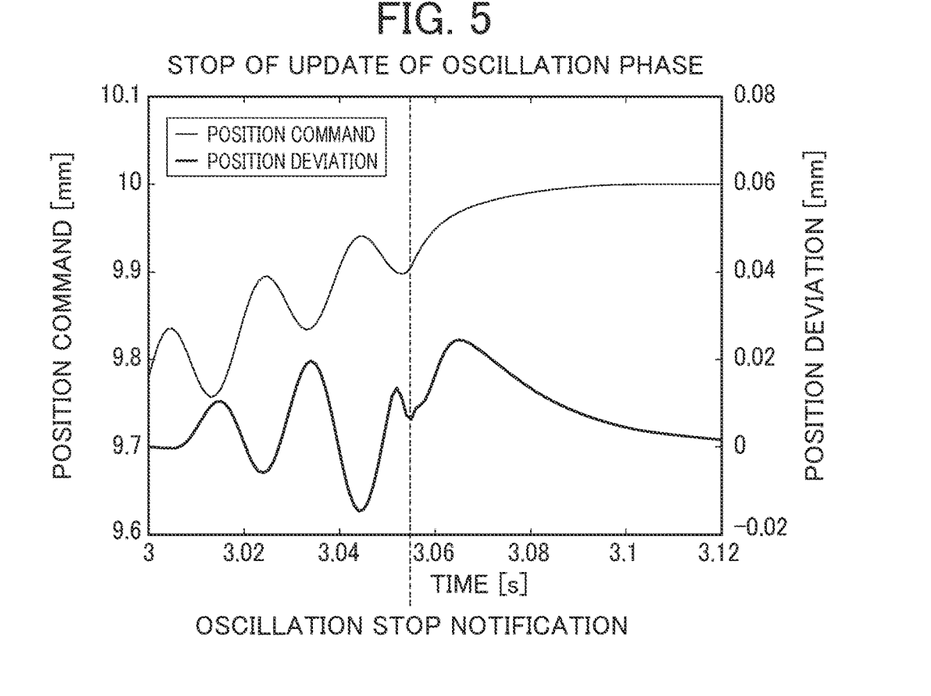
FIG. 5 is a graph showing a position command and a position deviation in a case where update of the oscillation phase is stopped upon oscillation stop notification in oscillation cutting in one embodiment of the present disclosure.

FIG. 5 is a graph showing the position command and the position deviation in a case where update of the oscillation phase is stopped upon oscillation stop notification in oscillation cutting in one embodiment of the present disclosure. In FIG. 5, the horizontal axis represents a time (seconds), a first axis (left) as the vertical axis represents the position command (the superimposition command) (mm), and a second axis (right) as the vertical axis represents the position deviation (mm). As shown in FIG. 5, update of the oscillation phase is stopped upon oscillation stop notification so that the position command, i.e., the superimposition command, after superimposition of the oscillation command can be quickly converged and a change in the position deviation can be smooth. Thus, oscillation can be smoothly stopped at an arbitrary timing without degradation of chip shredding properties, and therefore, the shock caused on the machine tool can be reduced and, e.g., shortening of the life of the machining tool and degradation of the accuracy of the machined workpiece can be reduced.

Figure 6:
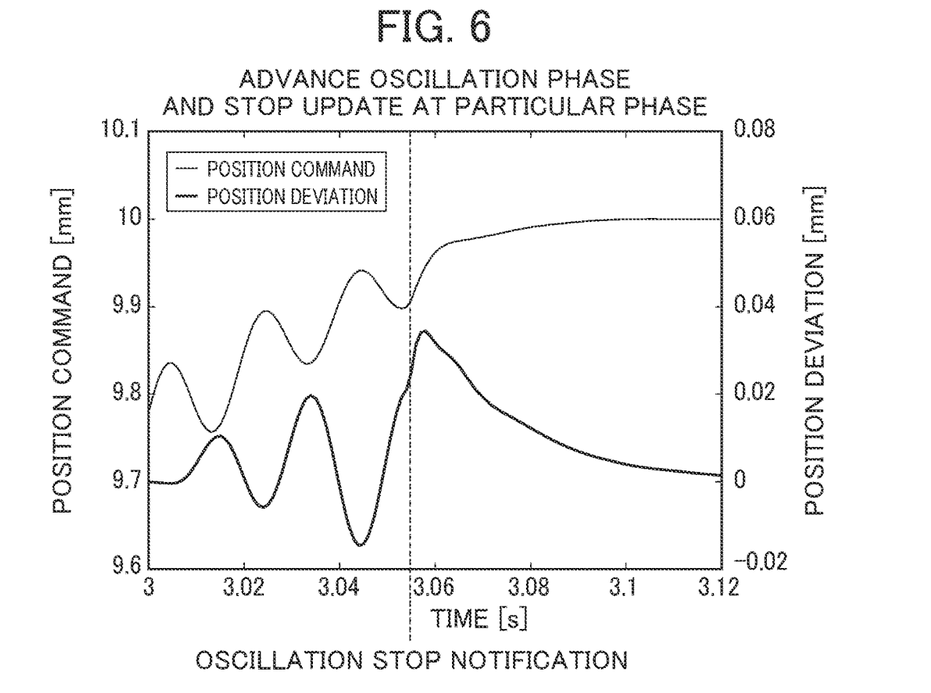
FIG. 6 is a graph showing a position command and a position deviation in a case where in oscillation cutting in one embodiment of the present disclosure, the oscillation phase is advanced upon oscillation stop notification and oscillation is stopped at a particular phase.

FIG. 6 is a graph showing the position command and the position deviation in a case where in oscillation cutting in one embodiment of the present disclosure, the oscillation phase is advanced after oscillation stop notification and oscillation is stopped at a particular phase (e.g., an oscillation phase of 0°). In FIG. 6, the horizontal axis represents a time (seconds), a first axis (left) as the vertical axis represents the position command (the superimposition command) (mm), and a second axis (right) as the vertical axis represents the position deviation (mm). As shown in FIG. 6, the oscillation phase is advanced to, e.g., a particular phase of 0° after oscillation stop notification and oscillation is stopped, and therefore, the position command, i.e., the superimposition command, after superimposition of the oscillation command can be quickly converged and a change in the position deviation can be smooth. Thus, as in the case of FIG. 5, oscillation can be smoothly stopped at an arbitrary timing without degradation of the chip shredding properties, and therefore, the shock caused on the machine tool can be reduced and, e.g., shortening of the life of the machining tool and degradation of the accuracy of the machined workpiece can be reduced.

According to the machine tool control device 1 of the present embodiment as described above, the following advantageous effects are produced. In the machine tool control device 1 according to the present embodiment, the oscillation stop determinator 13 that determines the oscillation stop timing is provided, and the oscillation command generator 12 that gradually attenuates the oscillation amplitude from a timing of notifying the oscillation stop determined by the oscillation stop determinator 13 is also provided. That is, in the machine tool control device 1 according to the present embodiment, the oscillation amplitude is not attenuated according to a movement command or a remaining movement distance as in the prior art, but is gradually attenuated until the oscillation stop after a timing of notifying the oscillation stop. With this configuration, the oscillation amplitude is gradually attenuated from a timing of notifying the oscillation stop so that a change in the position deviation can be smooth without a rapid change in the position command. Accordingly, the shock caused on the machine tool can be reduced, and therefore, e.g., shortening of the life of the machining tool and degradation of the accuracy of the machined workpiece can be reduced. Thus, according to the machine tool control device 1 of the present embodiment, oscillation can be smoothly stopped at an arbitrary timing without degradation of the chip shredding properties. Consequently, the shock caused on the machine tool can be reduced, and, e.g., shortening of the life of the machining tool and degradation of the accuracy of the machined workpiece can be reduced.

In the present embodiment, it is configured such that at a timing of notifying the oscillation stop, the filter is applied to the oscillation amplitude immediately before the oscillation stop or the oscillation amplitude immediately before the oscillation stop is decremented by the specified value. With this configuration, the oscillation amplitude can be reliably gradually attenuated until the oscillation stop.

In the present embodiment, it is configured such that at a timing of notifying the oscillation stop, update of the oscillation phase is stopped or the oscillation phase is advanced to the particular phase. With this configuration, the oscillation command and the superimposition command can be attenuated more quickly.

Note that the present disclosure is not limited to the above-described aspects and changes and modifications made within a scope in which the object of the present disclosure can be achieved are included in the present disclosure.

EXPLANATION OF REFERENCE NUMERALS

1 Machine Tool Control Device
10 Servo Control Device
11 First Adder
12 Oscillation Command Generator
13 Oscillation Stop Determinator
14 Second Adder
15 Learning Controller
16 Third Adder (Learning Controller)
17 Position/Speed Controller (Controller)
20 Position Command Generator
30 Motor

The invention claimed is:

1. A control device for a machine tool that performs machining while causing a tool and a workpiece to oscillate relative to each other, comprising:
an oscillation command generator that generates an oscillation command based on an oscillation condition;
an oscillation stop determinator that determines an oscillation stop timing; and
a controller that causes the tool and the workpiece to oscillate relative to each other based on a superimposition command generated by superimposition of the oscillation command on a movement command,
wherein the oscillation command generator gradually attenuates an oscillation amplitude by stopping update of an oscillation phase at a timing of notifying oscillation stop from the oscillation stop determinator when an absolute value of the oscillation command increases.

2. The control device for the machine tool according to claim 1, wherein the oscillation command generator gradually attenuates the oscillation amplitude by applying a filter to the oscillation amplitude immediately before the oscillation stop.

3. The control device for the machine tool according to claim 1, wherein the oscillation command generator gradually attenuates the oscillation amplitude by decrementing the oscillation amplitude immediately before the oscillation stop by a specified value.

4. The control device for the machine tool according to claim 1, wherein the oscillation stop determinator determines the oscillation stop timing based on a machining condition.

5. The control device for the machine tool according to claim 1, wherein the oscillation stop determinator determines the oscillation stop timing according to an external notification.

6. The control device for the machine tool according to claim 5, wherein the oscillation command generator corrects the oscillation amplitude and the oscillation phase such that oscillation is able to be stopped at an arbitrary timing notified by the external notification.

7. The control device for the machine tool according to claim 1, further comprising: a learning controller that calculates a superimposition command compensation amount based on the superimposition command to compensate the superimposition command by addition of the calculated compensation amount to the superimposition command.

8. A control device for a machine tool that performs machining while causing a tool and a workpiece to oscillate relative to each other, comprising:
an oscillation command generator that generates an oscillation command based on an oscillation condition;
an oscillation stop determinator that determines an oscillation stop timing; and
a controller that causes the tool and the workpiece to oscillate relative to each other based on a superimposition command generated by superimposition of the oscillation command on a movement command,
wherein the oscillation command generator gradually attenuates an oscillation amplitude by advancing a phase to a particular oscillation phase where an absolute value of the oscillation command is smallest and then stopping update of the phase at a timing of notifying oscillation stop from the oscillation stop determinator.

9. The control device for the machine tool according to claim 8, wherein the oscillation command generator gradually attenuates the oscillation amplitude by applying a filter to the oscillation amplitude immediately before the oscillation stop.

10. The control device for the machine tool according to claim 8, wherein the oscillation command generator gradually attenuates the oscillation amplitude by decrementing the oscillation amplitude immediately before the oscillation stop by a specified value.

11. The control device for the machine tool according to claim 8, wherein the oscillation stop determinator determines the oscillation stop timing based on a machining condition.

12. The control device for the machine tool according to claim 9, wherein the oscillation stop determinator determines the oscillation stop timing according to an external notification.

13. The control device for the machine tool according to claim 12, wherein the oscillation command generator corrects the oscillation amplitude and the oscillation phase such that oscillation is able to be stopped at an arbitrary timing notified by the external notification.

14. The control device for the machine tool according to claim 8, further comprising:
a learning controller that calculates a superimposition command compensation amount based on the superimposition command to compensate the superimposition command by addition of the calculated compensation amount to the superimposition command.

15. A control device for a machine tool that performs machining while causing a tool and a workpiece to oscillate relative to each other, comprising:
an oscillation command generator that generates an oscillation command based on an oscillation condition;
an oscillation stop determinator that determines an oscillation stop timing; and
a controller that causes the tool and the workpiece to oscillate relative to each other based on a superimposition command generated by superimposition of the oscillation command on a movement command,
wherein the oscillation command generator gradually attenuates an oscillation amplitude by applying a filter to the oscillation amplitude immediately before oscillation stop from a timing of notifying the oscillation stop from the oscillation stop determinator.

16. The control device for the machine tool according to claim 15, wherein the oscillation command generator gradually attenuates the oscillation amplitude by decrementing the oscillation amplitude immediately before the oscillation stop by a specified value.

17. The control device for the machine tool according to claim 15, wherein the oscillation stop determinator determines the oscillation stop timing based on a machining condition.

18. The control device for the machine tool according to claim 15, wherein the oscillation stop determinator determines the oscillation stop timing according to an external notification.

19. The control device for the machine tool according to claim 18, wherein the oscillation command generator corrects the oscillation amplitude and an oscillation phase such that oscillation is able to be stopped at an arbitrary timing notified by the external notification.

20. The control device for the machine tool according to claim 15, further comprising:
   a learning controller that calculates a superimposition command compensation amount based on the superimposition command to compensate the superimposition command by addition of the calculated compensation amount to the superimposition command.

* * * * *